US006123157A

United States Patent [19]

Barnes

[11] Patent Number: 6,123,157

[45] Date of Patent: Sep. 26, 2000

[54] ANTI-VIBRATION ADAPTOR

[75] Inventor: George Edward Barnes, Ingersoll, Canada

[73] Assignee: Ergonomics Specialties, Ingersoll, Canada

[21] Appl. No.: 09/270,799

[22] Filed: Mar. 17, 1999

Related U.S. Application Data

[63] Continuation-in-part of application No. 08/843,613, Apr. 10, 1997, which is a continuation-in-part of application No. 08/510,364, Aug. 2, 1995, abandoned.

[30] Foreign Application Priority Data

Dec. 29, 1994 [CA] Canada .................................. 2134949

[51] Int. Cl.[7] ............................ B23B 31/00; B23B 51/00

[52] U.S. Cl. ......................... 173/211; 173/213; 408/143; 279/157

[58] Field of Search .................................... 173/210, 211, 173/162.1, 162.2, 168, 171, 157; 409/141; 408/143, 238, 239 A, 239 R; 279/143, 145, 157

[56] References Cited

U.S. PATENT DOCUMENTS

| | | | |
|---|---|---|---|
| 3,058,559 | 10/1962 | Ohrnberger | 408/143 |
| 3,417,566 | 12/1968 | Gould | 173/213 |
| 3,499,351 | 3/1970 | Jacobson | 408/143 |
| 5,437,524 | 8/1995 | Huang | 279/157 |
| 5,564,717 | 10/1996 | Alberts | 279/145 |
| 5,601,149 | 2/1997 | Kawasaki et al. | 173/211 |
| 5,928,241 | 7/1999 | Menut et al. | 279/143 |

*Primary Examiner*—Scott A. Smith
*Attorney, Agent, or Firm*—McConnell and Fox

[57] ABSTRACT

Power drivers are commonly used in production to tighten fasteners such as nuts and bolts. The socket which engages the fastener is normally coupled to the drive shaft of the power driver by a square male end on the drive shaft and a complementary square female connector on the socket. These components are not produced to close tolerances and as a result there is substantial play permitting misalignment of the rotational axes of the drive shaft and the socket and some rotational freedom between the drive shaft and the socket. In accordance with the invention an anti-vibration adaptor is provided comprising a sleeve containing a cylinder of resilient material which surrounds a portion of the drive shaft and a portion of the socket, including the point of coupling, sufficiently closely to minimize misalignment of the rotational axes of the drive shaft and the socket and reduce rotational freedom.

3 Claims, 2 Drawing Sheets

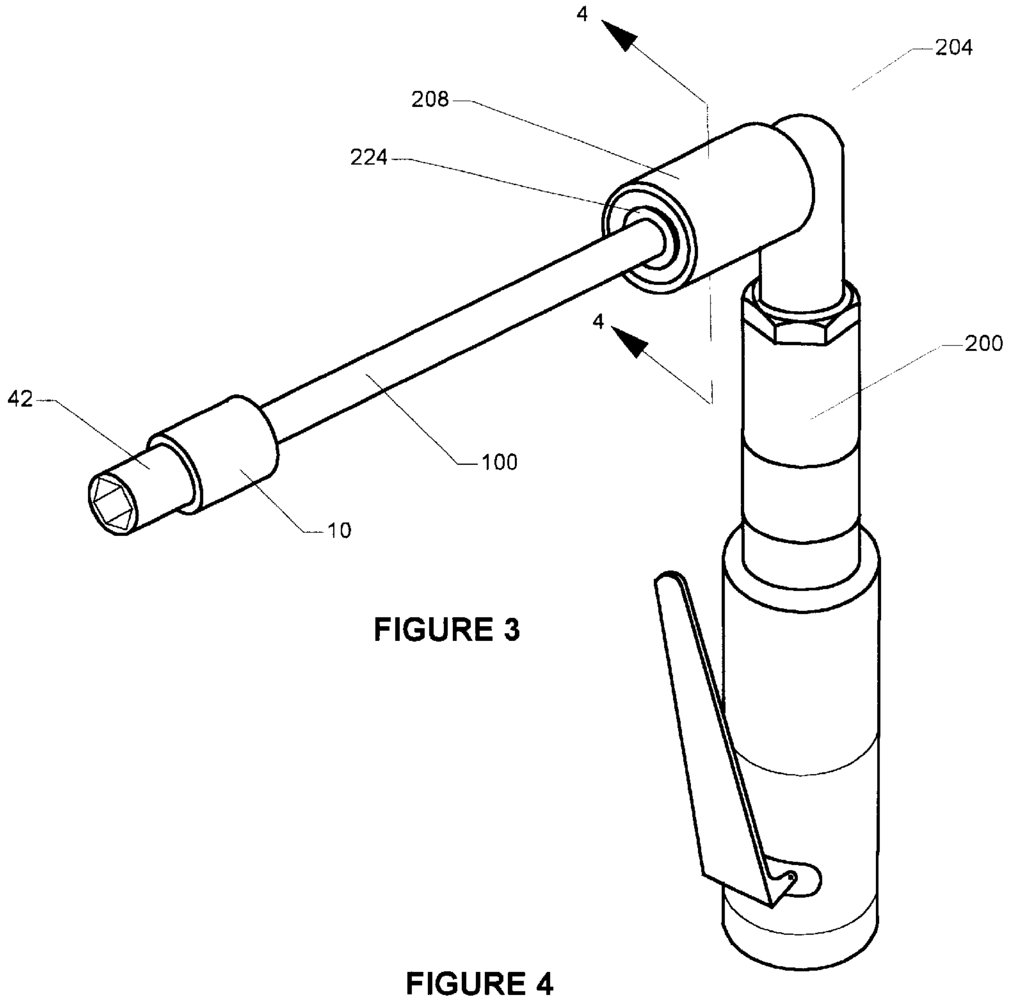
FIGURE 3
FIGURE 4
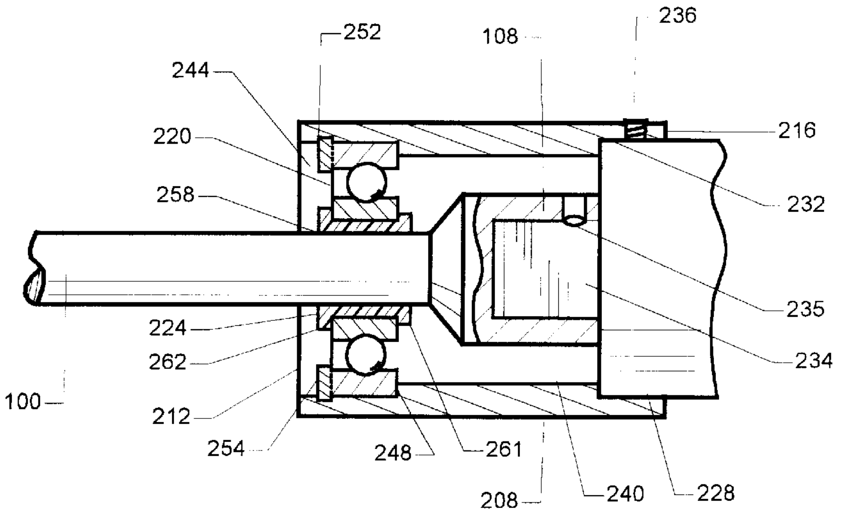

ANTI-VIBRATION ADAPTOR

CROSS REFERENCE TO RELATED APPLICATION

This application is a continuation-in-part of U.S. patent application Ser. No. 08/843,613 filed Apr. 10, 1997, pending, which is a continuation-in-part of application Ser. No. 08/510,364 filed Aug. 2, 1995, now abandoned.

FIELD OF THE INVENTION

The present invention relates to anti-vibration adaptors. More specifically, the present invention relates to anti-vibration adaptors which, when employed in conjunction with standard powered fastener drivers and socket-type driven heads, increases the torque transmitted to a fastener and decreases vibration experienced by the fastener driver which is subsequently transmitted to the operator.

DESCRIPTION OF THE PRIOR ART

Power fastener drivers such as pneumatic or electric powered pulse and/or impact wrenches as well as anglehead and /or straight nut runners, referred to herein simply as drivers, are well known in industrial environments. In particular in the automotive industry these types of drivers are used extensively in the assembly of automobiles. Typically such drivers comprise a pistol or club-style main body, a trigger, airline connections and a drive shaft which removably connects with any one of a plurality of driver heads and/or drive shaft extensions.

The driver heads comprise a plurality of various sized Imperial or SAE type sockets and screwdriver fittings, herein referred to as sockets, all of which are used to drive or "run down" a variety of fasteners including nuts and bolts. The variety of sockets available varies with the head style of the fastener. For example, while hexagonal type bolt heads are common, Allen-type and Torx-head bolts are are also used extensively in the automobile industry in a variety of sizes. Typically, the connection between the driver and the socket is accomplished via a male square drive connector on the drive shaft of the driver and a complementary female square drive connector on the socket which may be snapped together and retained by a spring pin disposed through the surface of the male square drive connector. However, other snap-on connector profiles are available which are equally effective. Generally these tools are designed to enable the operator to change sockets quickly depending on the size or head style of the fastener to be run-down, hence the popularity of these types of snap-on connections. However, due to the frequency of socket changes and the fact that the sockets are mass produced items, the majority of these types of drivers and sockets, including automotive industrial grade tooling, are not designed to close tolerances and have relatively large mating clearance. In most instances the resulting connection between the driver and the socket will suffer from two degrees of freedom, first the socket will be free to rotate a few degrees relative to the rotational position of drive shaft and second the rotational axis of the socket will be free deviate a few degrees from the rotational axis of the drive shaft.

In operation, deviation of the rotational axis of the socket from the rotational axis of the drive shaft will result in a circular motion of the end of the drive shaft and vibration of the driver. The relative freedom of rotation of the socket with respect to the drive shaft, particularly when the driver is an impact or pulsing driver, results in vibration of the driver and socket components relative to each other. Consequently, the tool operator is exposed to these vibrations which are transferred through the tool to the operator's hands and arms. In an environment such as the automotive industry where a typical assembly worker's primary function is to operate these drivers, these vibrations can cause serious physical injury. Further, the vibrations result in substantially elevated noise levels which can result in the operator suffering from permanent hearing loss if exposed for sufficient periods of time.

These vibrations have other detrimental effects. In particular, excessive vibration can cause premature breakdown of the internal bearings of the driver. Further, in many circumstances, such as the production of automobiles, fasteners are designed to be installed with a specific torque to which the drivers are preset. The vibrations result in losses in torque applied to the fastener which consequently results in fasteners not tightened to specification during production which results in poor statistical process control.

Overall the above-identified disadvantages of typical socket-driver connections result in torque losses, quality control and operator health problems which increase manufacturing costs and/or reduce final product quality. Therefore there is a long standing need in industry for an apparatus which reduces vibration when employed with a standard driver and socket.

SUMMARY OF THE INVENTION

It is an object of the present invention to provide a novel anti-vibration which mitigates at least one of the above described disadvantages of the prior art.

According to one aspect of the invention there is provided an anti-vibration adaptor for use with a standard releasable connection between the drive shaft of a driver and a socket the adaptor comprising: a housing which extends at least partially over both said drive shaft and said socket; a damping means disposed within said housing surrounding, but not intervening between the parts said releasable connection and enclosing at least a portion of said drive shaft and said socket with negligible clearance such that any misalignment of the rotational axes of the drive shaft and said socket is minimized.

According to another aspect of the present invention there is provided an anti-vibration adaptor for use with a driver having a drive shaft and socket coupled to said drive shaft through a releasable connection the adaptor comprising: a hollow cylindrical housing for enclosing said releasable connection and extending at least partially over both said drive shaft and said socket; damping means disposed in said housing having a first bore disposed in one of its ends, coaxially aligned and in communication with a second bore disposed in its opposite end; said first bore having a diameter to permit it to releasably receive a cylindrical portion of said drive shaft with negligable clearance or limited interference and said second having a diameter to permit it to releasably receive a cylindrical portion said socket with negligible clearance or limited interference whereby misalignment of the axes of rotation of said drive shaft and said socket is minimized and rotation of said drive shaft with respect said socket is inhibited.

The present invention further includes an anti vibration adaptor for use in association with a driver having a drive shaft releasably secured by a coupling to an extension shaft comprising: a housing which extends over said coupling and over at least a portion of said drive shaft and said extension shaft, said housing enclosing damping means which surrounds, but does not intervene between, said portions of said drive shaft and said extension shaft, with negligible clearance or slight interference.

Preferably said damping means is formed from Ultra High Molecular Weight (UHMW) polyethylene.

In accordance with the present invention the housing is preferably in the form of a hollow cylinder formed from any one of steel, stainless steel, aluminum, copper, brass, cast iron, and titanium, fibreglass, carbon fibre composites and plastics.

The present invention includes anti-vibration adaptors which fit tightly over both that portion of the socket that contains the releasable connection and a portion of the drive shaft, but does not intervene between the drive shaft and the socket, thereby substantially eliminating axial misalignment of the rotational axis of the socket and the rotational axis of the drive shaft and additionally inhibiting rotational movement of the drive shaft with respect to the socket.

Advantages of the present invention include an anti-vibration adaptor which tightly fits over the conventional joint between a drive shaft on a fastener driver and a driver head thereby eliminating any run-out in the joint.

Advantages of the present invention include reduction of vibration due to misalignment of the rotational axes of the drive shaft and the socket and/or rotational movement of the drive shaft with respect to the socket.

Another advantage of the present invention is that reduction of misalignment of the rotational axis of the drive shaft and the rotational axis of the socket, reduces torque lost due to such misalignment significantly and errors of torque measurement caused by vibration from axial misalignment or from freedom of the drive shaft to rotate with respect to the socket are also reduced.

BRIEF DESCRIPTION OF THE DRAWINGS

Presently preferred embodiments of the invention will now be described, by way of example only, with reference to the accompanying drawings, in which:

FIG. 3 shows a perspective view of a right angle tool fitted with a tool mounted anti-vibration adaptor and an extension shaft in accordance with a second embodiment of the present invention.

FIG. 4 shows a sectional view of the tool mounted anti-vibration adaptor of FIG. 3 taken along section line 4—4.

DETAILED DESCRIPTION OF THE PREFERRED EMBODIMENT

Figures 1, 2:
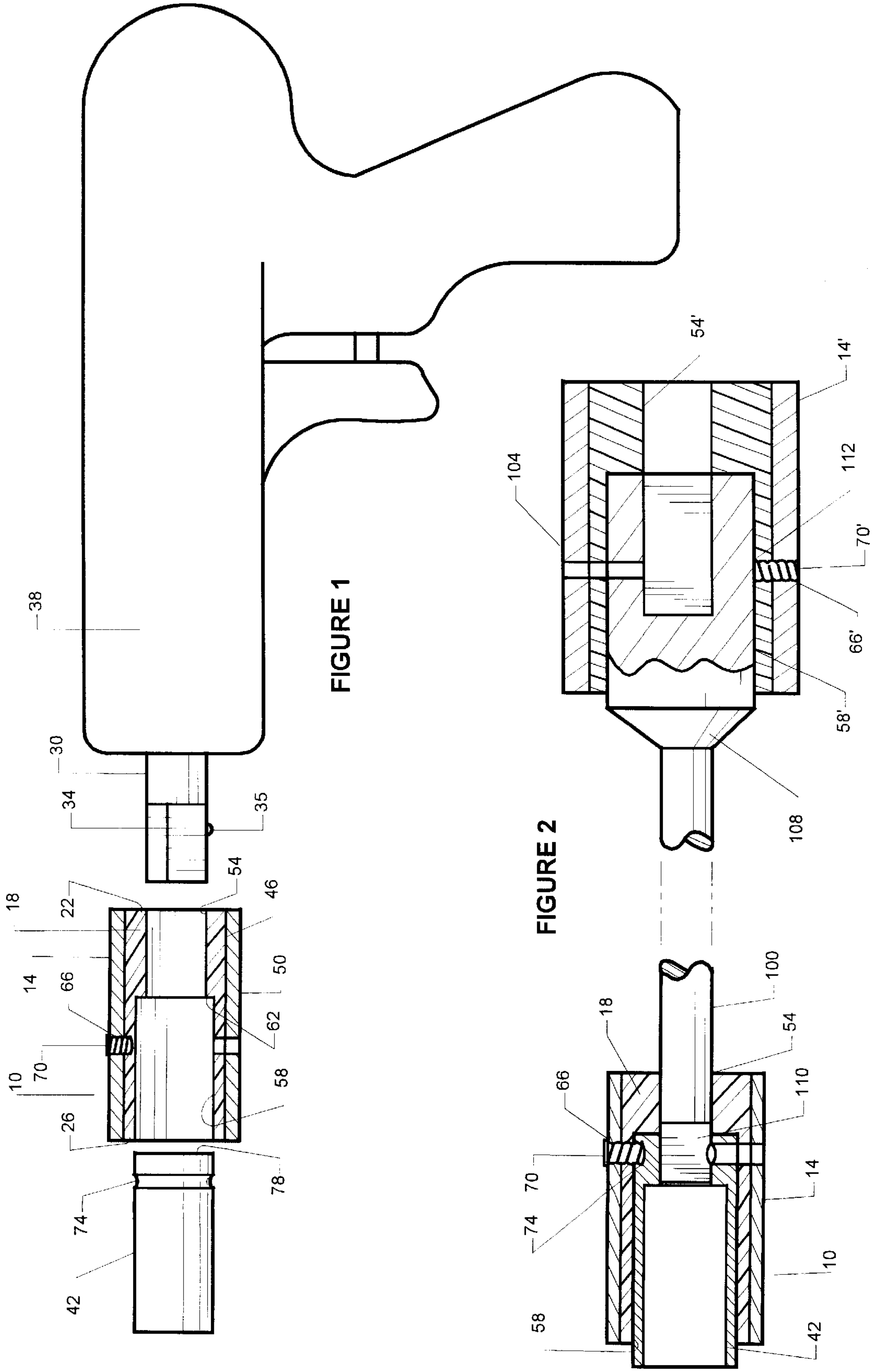
FIG. 1 shows an exploded view of a pulse wrench, a socket and a section of an anti-vibration adaptor in accordance with an embodiment of the present invention.
FIG. 2 shows a sectional view of a socket mounted on one end of a conventional extension shaft and held in alignment by an anti-vibration adaptor. with the other end of the extension shaft connected to a drive shaft and held in alignment by a further anti-vibration adaptor.

An anti-vibration adaptor in accordance with the present invention is shown in FIG. 1 and is indicated generally at 10. Adaptor 10 generally comprises a housing 14, a damping means, which in the present embodiment comprises a damping sleeve 18 having a pair of ends 22 and 26. End 22 is sized to engage a shaft 30 and square drive 34 of a conventional driver such as pulse wrench 38 while end 26 is sized to engage a conventional socket 42. The size of both ends of the damping sleeve is preferably such as to produce a slight interference fit. The resulting fit may be termed a slip fit. Because of the resilience of the material of the damping sleeve the driver and socket may be assembled or disassembled by hand but the interference inhibits rotary motion between the adaptor, socket and the shaft. Pulse wrench 38 may be any conventional pneumatic or electric driver as, previously described, which typically accommodates ¼", ⅜" or ½" square or hexagonal drive type sockets 42. However, adaptor 10 may be sized to accommodate smaller or larger type socket wrench systems with a variety of drive configurations. It will be noted that the adaptor does not replace the standard coupling between the drive and the socket but merely surrounds it.

Housing 14 generally cylindrical, annular in cross. section and preferably is formed from stainless steel or aluminum having generally smooth inner and outer diameters 46 and 50 respectively. However, it is contemplated that housing 14 may be formed from any suitable material such as steel, brass, copper, titanium, cast iron, composites such as fibreglass or carbon fibre and plastics. Damping sleeve 18, is provided with an outer diameter which is sized for interference press fit engagement with inner diameter 46 of housing 14 and is of a length which is substantially equal to the length of housing 14.

Damping sleeve 18 is provided with a centrally located, longitudinal first bore 54, located adjacent end 22 and in communication with a longitudinal second bore 58 adjacent end 26, coaxially aligned with first bore 54. Preferably, damping sleeve 18 is formed from Ultra High Molecular Weight polyethylene (UHMW) such as that manufactured by the Cadillac Plastic & Chemical Company of Troy Michigan, in the United States. UMHW is presently preferred as it provides a high degree of abrasion resistance and has a relatively low coefficient of friction which provides for a longer life cycle and good vibration damping properties.

First bore 54 has a diameter which is selected to provide minimal clearance or a slight interference around the cylindrical portion of square drive 34 and shaft 30 of pulse wrench 38 and is of a length which allows square drive 34 to pass into the second bore 58. Second bore 58 is sized to removably receive the cylindrical portion of socket 42, preferably with a slight interference , and to permit engagement of the socket with the square drive 34 in the conventional manner. The diameter of bores 54 and 58 is preferably such as to produce a slip fit, as earlier defined, between the adaptor and shaft 30 and the adaptor and the socket 42. As shown in FIG. 1, the diameter of second bore 58 is such that a seat 62 is formed at the junction of first bore 54 and second bore 58 which serves to locate socket 42 when positioned therein. A means to rotationally locate adaptor 10 relative to socket 42 is provided.

In the presently preferred embodiment the means to rotationally locate the adaptor relative to the socket is at least one threaded bore 66 which passes radially through housing 14 and damping sleeve 18 to second bore 58 and is longitudinally positioned to permit a grub screw 70, or other suitable fastener threaded therein, to enter a bored hole 74, dimple or retaining groove on socket 42. It is contemplated that other means of locating adaptor 10 relative to socket 42 may also be employed, such as high strength glue, a key groove cut into socket 42 with a complementary key ridge in bore 58 etc. or any other means which inhibits rotation of the socket relative to the adaptor.

To employ the present invention, socket 42 is pressed through end 26 into bore 58 until it is firmly seated against seat 62. Grub screw 70 is then screwed through threaded bored hole 74, until socket 42 is secured in place. Adaptor 10, disposed over socket 42 is then placed onto pulse wrench 38 by pressing square drive 34 and shaft 30 into end 22 and first bore 54. Square drive 34 passes through first bore 54 and engages a complementary female connector 78 on the rear face of socket 42 in a conventional manner. A spring retainer 35, disposed through the surface of square drive 34, retains socket 42 also in a conventional manner. When fully assembled, the fit between shaft 30 and first bore 54 provides negligable clearance or preferably a slight interference as does the fit between socket 42 and second bore 58. Consequently the adaptor 10 surrounds the conventional square drive joint between socket 42 and shaft 30 and minimizes any rotational axis misalignment of these two elements and additionally inhibits rotational motion of the socket 42 relative to shaft 30.

In operation the damping sleeve 18 serves several purposes. First, as it fits tightly around both shaft 30 and socket 42 axial misalignment is minimized. This reduces vibration of the driver and more torque is transferred to the socket 42. Second, the tight fit inhibits relative rotational motion between the drive shaft 30 and socket 42 which is particularly important when the driver is an impact or pulse driver. Thirdly, the UHMW material used in sleeve 18 absorbs a portion of any vibration which is created thus reducing any vibration transmitted to the driver and experienced by the operator.

As shown in FIG. 2, when pulse wrench 38 is used in conjunction with a shaft extension 100, additional vibration reduction can be achieved by using a second anti-vibration adaptor 104. Shaft extension 100 is of the conventional type and is provided with a square drive connector female end 108 and a square drive connector male end 110. Adaptor 104 is substantially similar to adaptor 10, like elements being indicated with primed numerals. In this embodiment, the second bore 58 is sized to accommodate female end 108 and threaded bore 66 is positioned along housing 14 such that grub screw 70 will enter a bored hole 112, dimple or retainer groove on the female end 108 of shaft extension 100.

Second bore 58 is sized to create an interference fit when placed over female end 108 with negligible clearance thereby establishing a fixed connection between adaptor 104 and shaft extension 100. In practice, engagement of adaptor 104 and shaft extension 100 is accomplished by lightly press fitting the components together. This is achieved by pressing second bore 58 of adaptor 104 over female end 108 until in a fully seated position as indicated in FIG. 2. However it is contemplated that it is possible to size bore 58 with a small clearance or very slight interference and so create a releasable connection between female end 108 and second bore 58. Provided that any clearance maintains a connection with minimum rotational axis misalignment the anti-vibration characteristics of adaptor 104 will not be unduly compromised.

First bore 54 is sized to receive shaft 30 removably and square drive 34 in a manner substantially identical to the connection of adaptor 10 and pulse wrench 38 of FIG. 1.

Similarly adaptor 10 and socket 42 mounted therein installs to male end 110 of extension shaft 100 in a manner identical to the installation of the adaptor to pulse wrench 38, as described with respect to FIG. 1.

Performance testing of adaptors 10 and 104 was performed using a 12 mm socket, a 6" extension shaft mounted onto a Uryu UX500 Pulse wrench having a ⅜" square drive. The socket, extension shaft were all new and the pulse wrench was rebuilt to new conditions. Comparison measurements for torque and vibration were made with this configuration with and without adaptors 10 and 104. The test was conducted in an automotive production environment, specifically a bumper installation application, in which five fastener run-downs were required per vehicle. Initial torque settings for each pulse wrench were made with a Uryu UET200 torque setting tool. Torque measurements were made prior to installation using a Tonichi torque wrench. Vibration measurements were made at the pulse wrench using a SKF CMVP20 Vibration Check Unit.

The results obtained were as follows. Initial measurements of the pulse wrench were conducted with the torque set at 200 kgf-cm indicated a 32.14% increase in static torque measured on the fastener and a 97.35% decrease in vibration at the tool when adaptors 10 and 104 were used compared to the control case without adaptors 10 and 104.

After 50,000 fastener run-downs, to determine the effect of wear on the results, measurements conducted with the torque set at 250 kgf-cm indicated a 21% increase in static torque measured on the fastener and a 94.2% decrease in vibration at the tool when adaptors 10 and 104 were used compared to the control case without adaptors 10 and 104.

These tests were again performed after 225,000 fastener run-downs, with measurements conducted with the torque set at 220 kgf-cm and a 12.5% increase in torque was measured on the fastener and a 95.9% decrease in vibration at the tool was measured when adaptors 10 and 104 were used as compared to the control case without adaptors 10 and 104. 225,000 run-downs is representative of the full life of adaptors 10 and 104. These results clearly indicate that significant increases in torque and decreases in vibration experienced by the operator can be achieved when adaptors 10 and 104 are employed.

A similar test was performed using the above-identified equipment but instead using a single adaptor mounted directly on the pulse wrench with no shaft extension in place. The results indicated a 92.35% reduction of vibration at the tool and an increase in fastener torque of 18.2%.

In some situations it has been found advantageous to employ an anti-vibration adaptor which physically mounts to the body of the tool. FIG. 3 shows such a situation in which an anti-vibration adaptor, generally indicated at 204 is directly mounted to a tool 200 which, for example purposes, is illustrated as a right angle tool. However, tool 200 may be any suitable straight nutrunner, multi-head driver or similar tool as previously described. Adaptor 204, as seen in section in FIG. 4, generally comprises a housing 208 having a pair of ends 212 and 216, a bearing 220 and a damping means which, in the preferred embodiment comprises a damping sleeve 224.

Housing 208 is generally cylindrical and annular in cross-section and preferably formed from stainless steel or aluminum although other materials such as the above-described with respect to FIG. 1 may be employed. Housing 208 adjacent end 216 is provided with a first bore 228 which is sized to removably engage a body portion 232 of tool 200, centered about a square drive 234. Housing 208 is secured to tool 200 using suitable fixing means, such as three grub screws 236 circumferentially spaced 120° apart. Other tool fixing means may be a threaded portion on housing 208 which engages a complementary threaded portion on tool 200 or any other suitable method of fixing adaptor 204 to tool 200 as would occur to those skilled in the art.

A longitudinally oriented second bore 240 is located in a mid portion of housing 208 and is coaxially aligned and in communication with first bore 228. Second bore 240 is sized to freely accommodate shaft extension 100 which mounts to square drive 234 in the conventional manner.

A longitudinal third bore 244, is coaxially aligned and in communication with second bore 240, adjacent end 212. Third bore 244 is sized to accommodate bearing 220 which abuts a seat 248 formed at the union of second and third bores 240 and 244 respectively. A groove 252 is provided in the wall of third bore 244 adjacent bearing 220 which receives a snap ring 254 for the purpose of retaining bearing 220 in position.

Damping sleeve 224 is an annular member which is provided with an outer diameter sized for an interference press-fit engagement with the inner diameter of bearing 220. The outer diameter of damping sleeve 224 includes a shoulder 262 at one end which cannot pass through bearing 220 and a smaller shoulder 261 at the other end which can be forced through bearing 220. The spacing between shoulders 261 and 262 substantially corresponds to the longitudinal length of the inner diameter of bearing 220. Damping sleeve 224 is press-fitted into bearing 220 so that shoulders 261 and 262 abut bearing 220 to maintain damping sleeve 224 in place. As with other previously described damping sleeves, damping sleeve 224 is preferably formed from UHMW such as that manufactured by CADCO® which offers a relatively high degree of abrasion resistance and a relatively low coefficient of friction. Damping sleeve 224 has an inner diameter 258 which is sized to fit around shaft extension 100 with negligible clearance.

In operation, female end 108 of extension shaft 100 is fitted to square drive 234 of tool 200 and is retained by a conventional spring pin 235. Male end 40 of shaft extension 100 is pressed through inner diameter 258 of damping sleeve 224 until first bore 232 slides over and is seated on tool housing 228. Once seated, grub screws 236 are tightened onto tool 200 to secure adaptor 204 in place.

In addition to adaptor 204, tool 200 may also preferably employ adaptor 10 at socket 42. In either case, adaptor 204 reduces the vibration experienced by the tool operator and increased the torque transmitted to shaft 100 in a manner similar to that described above in regard to adaptor 10.

The present invention has been described with reference to a presently preferred embodiment. Other variations and embodiments of the present invention may be apparent to those of ordinary skill, in the art. It is emphasized however, that the adaptor is not a replacement for the conventional driver socket coupling but is employed as an auxiliary device which improves the operation of the coupling. Accordingly, the scope of protection sought for the present invention is only limited as set out in the attached claims.

I claim:

1. An anti-vibration adaptor for use in association with a rotary fastener driving means, having cylindrical body portion centered about a rotary drive shaft having an axis of rotation and an associated fastener driving device, having an axis of rotation, coupled to said drive shaft by means of a releasable coupling, said adaptor comprising:

a cylindrical housing having first and second ends said first end removably mountable on said body portion;

a bearing mounted in the second end of said housing;

resilient damping means mounted in said bearing and formed to receive said fastener driving device and maintain the axis of rotation of said drive shaft aligned with the axis of rotation of said fastener driving device.

2. An anti-vibration adaptor as claimed in claim 1 wherein said first end of said housing is threaded to engage a corresponding thread on said body portion.

3. An anti-vibration adaptor as claimed in claim 1 wherein said fastener driving device comprises an extension shaft and a socket releasably coupled thereto and said resilient damping means is formed to tightly receive said extension shaft.

* * * * *